United States Patent
Feuilloley et al.

(10) Patent No.: US 9,757,878 B2
(45) Date of Patent: *Sep. 12, 2017

(54) METHOD FOR HEATING A CONTAINER BLANK, THE TEMPERATURE OF THE OUTER WALL OF WHICH IS LOW, AND UNIT FOR HEATING BLANKS

(75) Inventors: Guy Feuilloley, Octeville sur Mer (FR); Caroline Bellec, Octeville sur Mer (FR); Isabelle Maillot, Octeville sur Mer (FR); Mikael Derrien, Octeville sur Mer (FR)

(73) Assignee: SIDEL PARTICIPATIONS, Octeville sur Mer (FR)

( * ) Notice: Subject to any disclaimer, the term of this patent is extended or adjusted under 35 U.S.C. 154(b) by 533 days.

This patent is subject to a terminal disclaimer.

(21) Appl. No.: 14/128,831

(22) PCT Filed: Jun. 18, 2012

(86) PCT No.: PCT/FR2012/051366
§ 371 (c)(1),
(2), (4) Date: Feb. 10, 2014

(87) PCT Pub. No.: WO2012/175854
PCT Pub. Date: Dec. 27, 2012

(65) Prior Publication Data
US 2014/0145375 A1 May 29, 2014

(30) Foreign Application Priority Data
Jun. 23, 2011 (FR) .................................. 11 55561

(51) Int. Cl.
*B29C 35/02* (2006.01)
*B29B 13/02* (2006.01)
(Continued)

(52) U.S. Cl.
CPC ........ *B29C 35/0288* (2013.01); *B29B 13/024* (2013.01); *B29C 49/6454* (2013.01); *B29C 49/68* (2013.01); *B29C 49/786* (2013.01)

(58) Field of Classification Search
None
See application file for complete search history.

(56) References Cited

U.S. PATENT DOCUMENTS

| | | | |
|---|---|---|---|
| 4,036,927 A | 7/1977 | Stolki | |
| 2004/0024560 A1* | 2/2004 | Shelby | B29C 49/6454 702/130 |

(Continued)

FOREIGN PATENT DOCUMENTS

| | | |
|---|---|---|
| EP | 2052842 A1 | 4/2009 |
| FR | 2 935 924 A1 | 3/2010 |

(Continued)

OTHER PUBLICATIONS

International Search Report of PCT/FR2012/051366 dated Aug. 31, 2012.

*Primary Examiner* — Monica Huson
(74) *Attorney, Agent, or Firm* — Sughrue Mion, PLLC

(57) ABSTRACT

Method of heating a blank (2) of plastic material for the manufacture of a hollow body by forming from the blank (2), which comprises the operations consisting of:
  inserting the blank (2) into an oven (7) provided with sources (9) of monochromatic or pseudo-monochromatic electromagnetic radiation emitting in the infrared range;
  exposing the blank (2) to the radiation from the sources (9), adjusted to a predetermined emission power for a predetermined exposure time;
  measuring a temperature on an outer wall (16) of the blank (2);
Characterized in that it comprises an operation consisting of:

(Continued)

adjusting the exposure time and/or the emission power so that said temperature at an exit from the oven (2) [sic: (7)], does not fall between $T_g$ and $1.8 \cdot T_g$, where $T_g$ is the glass transition temperature of the material.

11 Claims, 3 Drawing Sheets

(51) Int. Cl.
*B29C 49/64* (2006.01)
*B29C 49/68* (2006.01)
*B29C 49/78* (2006.01)

(56) References Cited

U.S. PATENT DOCUMENTS

| | | |
|---|---|---|
| 2007/0096352 A1 | 5/2007 | Cochran et al. |
| 2008/0305203 A1* | 12/2008 | Plantamura ........... B29B 13/024 425/174.4 |
| 2011/0236518 A1 | 9/2011 | Cetinel et al. |

FOREIGN PATENT DOCUMENTS

| | | |
|---|---|---|
| WO | 2007/149221 A2 | 12/2007 |
| WO | 2010/031923 A1 | 3/2010 |
| WO | 2011/033418 A1 | 3/2011 |

\* cited by examiner

METHOD FOR HEATING A CONTAINER BLANK, THE TEMPERATURE OF THE OUTER WALL OF WHICH IS LOW, AND UNIT FOR HEATING BLANKS

CROSS REFERENCE TO RELATED APPLICATIONS

This is a National Stage of International Application No. PCT/FR2012/051366 filed Jun. 18, 2012, claiming priority based on French Patent Application No. 1155561 filed Jun. 23, 2011, the contents of all of which are incorporated herein by reference in their entirety.

The invention concerns the manufacture of containers, particularly bottles, jars, by forming from blanks of plastic material such as polyethylene terephthalate (PET).

Hereinafter, it is assumed that the blanks are preforms, although it may involve intermediate containers having undergone a first blowing and intended to undergo a second one in order to obtain the final container.

The manufacture of containers involves two principal steps: a heating step during which the blanks are exposed to electromagnetic radiation from sources emitting in the infrared range, followed by a forming step during which a fluid under pressure is injected into the blanks thus heated, to give them the final shape of the container.

The wall thickness of the preforms is generally several millimeters, while the thickness of the final container is less than one millimeter (ordinarily on the order of several tenths of a millimeter). It will be understood, therefore, that the rate of deformation of the material (which undergoes both axial and radial stretching) varies with the thickness of the preform. More specifically, the rate of stretching of the inner wall of the preform is greater than the rate of stretching of the outer wall, in proportions corresponding to the surface variations of the walls during blowing.

Because of the complexity of the shapes of the finished container, which makes it difficult to calculate the final surface of the inner and outer walls of the container, the rate of deformation of the material is evaluated by calculating a rate of bi-orientation of each wall, defined by the product of the diametral and axial rates of stretching of the wall concerned.

Let us consider the example of a 27-g preform with outside diameter $D_{ext}$ of 22.26 mm, inside diameter $D_{int}$ of 14.56 mm, outside length $L_{ext}$ below the neck of 85 mm, and inside length $L_{int}$ below the neck of 79 mm, intended to form a container with a capacity of 0.51, average diameter D of 65.5 mm (the difference between the inside diameter and outside diameter of the container can be neglected) and an average length L below the neck of 243 mm.

The diametral $TD_{ext}$ and axial $TA_{ext}$ stretching rates of the outer wall are calculated as follows:

$$TD_{ext} = \frac{D}{D_{ext}} = \frac{65.5}{22.26} = 2.95$$

$$TA_{ext} = \frac{L}{L_{ext}} = \frac{243}{85} = 2.86$$

Consequently, the rate of bi-orientation, noted as $BO_{ext}$ of the outer wall is calculated as follows:

$$BO_{ext} = TD_{ext} \times TA_{ext} = 2.95 \times 2.86 = 8.44$$

The diametral $TD_{int}$ and axial $TA_{int}$ stretching rates of the inner wall are calculated as follows:

$$TD_{int} = \frac{D}{D_{int}} = \frac{65.5}{14.56} = 4.5$$

$$TA_{int} = \frac{L}{L_{int}} = \frac{243}{79} = 3.08$$

Consequently, the rate of bi-orientation, noted as $BO_{ext}$ of the outer wall is calculated as follows:

$$BO_{int} = TD_{int} \times TA_{int} = 4.5 \times 3.08 = 13.86$$

The preceding calculations furnish the ratio R between the bi-orientation rates $BO_{int}$ and $BO_{ext}$ of the inner and outer walls:

$$R = \frac{BO_{int}}{BO_{ext}} = \frac{13.86}{8.44} = 1.65$$

In other words, the inner wall of the preform has a bi-orientation rate about 65% greater than that of the outer wall.

This stretching difference between the inner wall and outer wall causes the appearance of stresses in the material between the walls, which makes the impression, and thus the correct forming of the container, difficult.

This is why it appears necessary to give the inner wall a greater capacity for deformation than the outer wall. Within this context, it is known to adapt the heating process so as to obtain a temperature $T_{int}$ of the inner wall that is greater than the temperature $T_{ext}$ of the outer wall or, in other words, a positive temperature delta $\Delta T$ (where $\Delta T = T_{int} - T_{ext}$). Indeed, in the conventional heating methods (particularly by halogen lamps), the temperature delta $\Delta T$ is negative by default, the outer wall temperature $T_{ext}$ being greater than the inner wall temperature $T_{int}$.

As this is explained in French patent application FR 2 935 924 (SIDEL), to obtain a positive temperature delta, essentially two parameters are adjusted: on the one hand, the ventilation of the preforms so as to cool the outer wall, and on the other hand, the thermal stabilization time of the preforms upon completion of heating, so as to balance the temperatures by thermal conduction.

However, the precise control of the temperature delta is difficult.

Moreover, the energy balance is relatively poor. Indeed, not only is high power needed for the radiation to bring the internal temperature to the desired value (which requires proportionally high electric power), but it is necessary to have extra power to ventilate the outer wall in order to lower its temperature.

A first objective is to improve the forming capacity of containers by better controlling the temperature delta between the inner wall and outer wall.

A second objective is to improve the energy balance of the heating, while preserving (and preferably improving) the quality of the final container.

To that end, firstly, a method is proposed of heating a blank of plastic material for the manufacture of a hollow body by forming from the blank, which comprises the operations consisting of:
  inserting the blank into an oven provided with sources of monochromatic or pseudo-monochromatic electromagnetic radiation emitting in the infrared range;
  exposing the blank to the radiation from the sources, adjusted to a predetermined emission power for a predetermined exposure time;

measuring a temperature on an outer wall of the blank;
adjusting the exposure time and/or the emission power so that the temperature $T_{ext}$ of the blank, measured at an exit from the oven,
does not fall between $T_g$ and 1.8. $T_g$, where $T_g$ is the glass transition temperature of the material.

It has been found that, under these conditions, the temperature of an inner wall of the blank remains higher than the temperature of the outer wall, i.e., the temperature delta is positive. The result is that, for a relatively low consumption of electric power, there is a better blowability of the blanks, and particularly a decrease in residual stresses in the final product.

The temperature measurement can be localized, or can consist of establishing a thermal profile of the outer wall of the blank by means of a thermal imaging camera.

The variation of the exposure time can be accomplished by turning off certain sources, or by turning off groups of sources, or by varying the speed of the blanks as they pass through the oven.

Secondly, a computer program product is proposed, intended to be stored in memory of a processing unit and/or stored on a storage medium readable by a reader of a processing unit, comprising instructions for the implementation of the operations set forth above.

Thirdly, a unit is proposed for heating hollow body blanks made of plastic material, which comprises:
an oven provided with a plurality of sources of monochromatic or pseudo-monochromatic electromagnetic radiation emitting in the infrared range, for the heating of the blanks at a predetermined emission power, and for a predetermined exposure time,
a thermal probe placed at an exit of the oven, arranged for taking the temperature on an outer wall of the blanks;
a programmed control unit for adjusting the emission power and/or the exposure time as long as the temperature $T_{ext}$ of the blank, measured at the exit of the oven, does not fall between $T_g$ and 1.8. $T_g$, where $T_g$ is the glass transition temperature of the material.

The sources of electromagnetic radiation, which are preferably organized in columns for which the power can be modulated separately, are for example lasers, and particularly laser diodes. According to a particular embodiment, this involves VCSEL-type laser diodes.

Other objects and advantages of the invention will be seen from the following description of preferred embodiments, provided with reference to the appended drawings in which.

Figure 1:
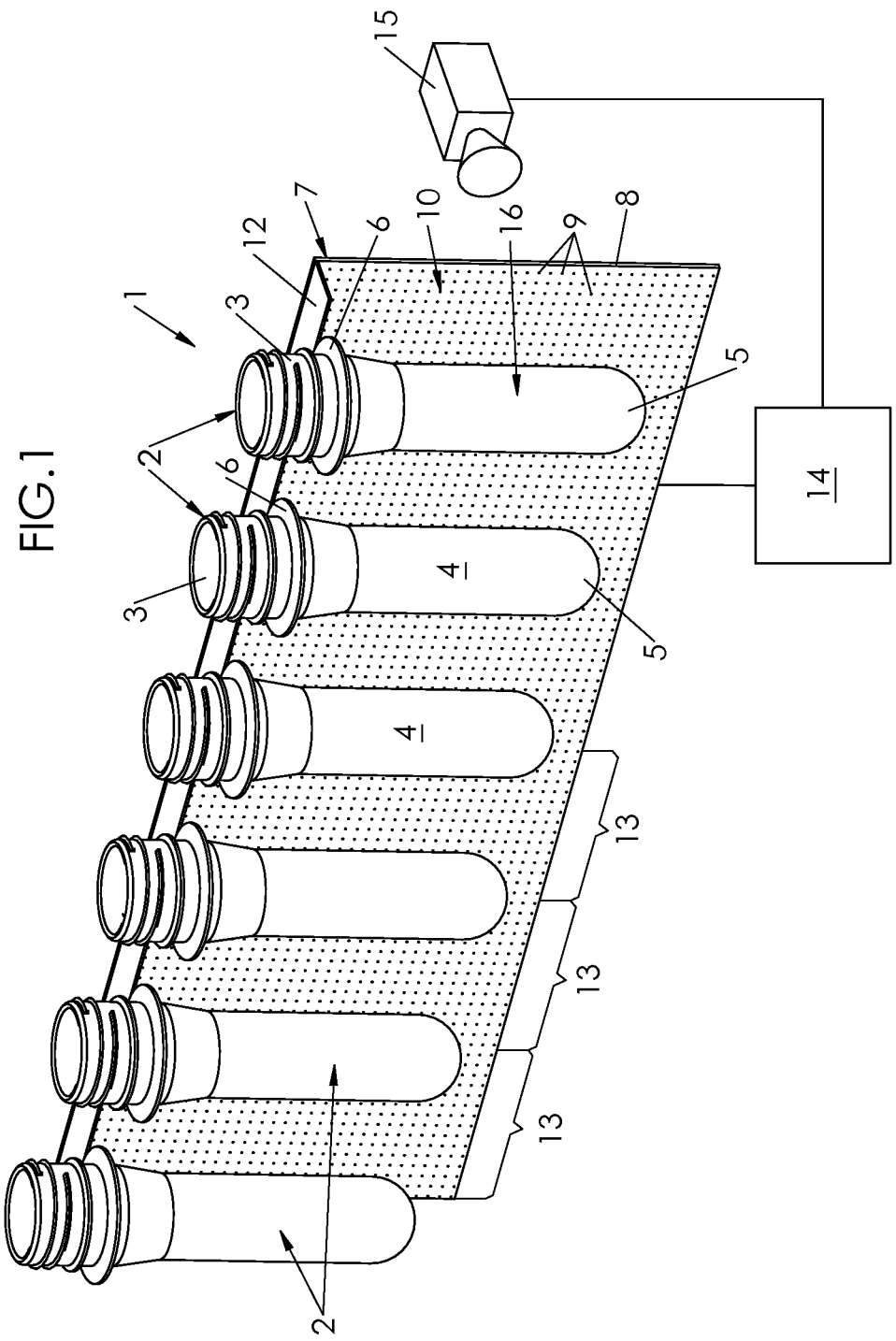
FIG. 1 is a view in perspective partially illustrating a heating unit comprising a wall lined with point infrared sources, in front of which the preforms travel.
Figure 2:
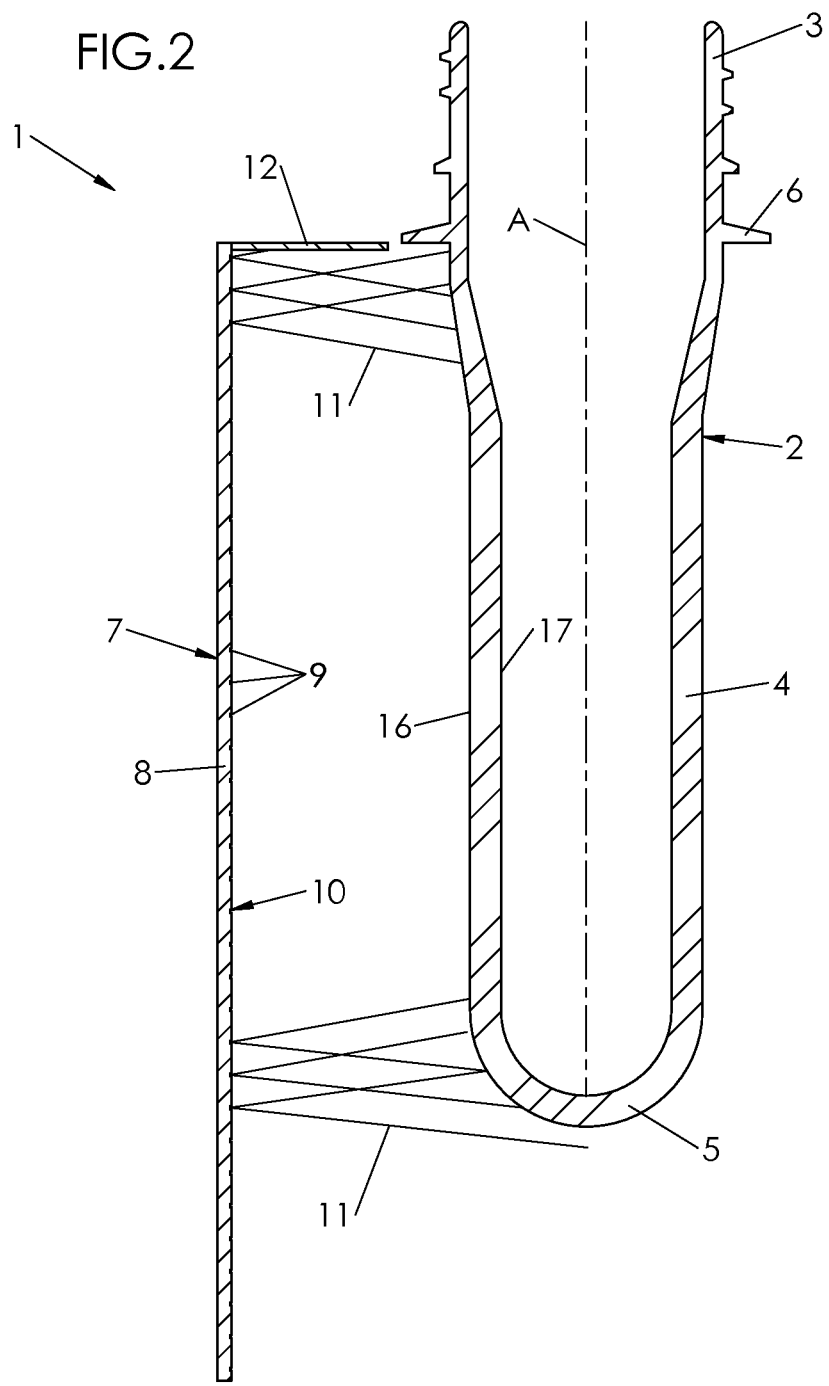
FIG. 2 is an elevation view in transverse cross-section of the heating unit of FIG. 1.

Diagrammatically represented in FIGS. 1 and 2 is a unit 1 for heating blanks 2 of containers. In this instance, the blanks 2 are preforms, but it could involve intermediate containers having undergone temporary forming operations and intended to undergo one or more subsequent operations to obtain the final containers.

Each preform 2, produced from a thermoplastic material such as polyethylene terephthalate (PET), comprises a neck 3, which is not heated (or only slightly heated), the shape of which is final, and a body 4 that terminates opposite the neck 3 in a hemispherical (or in some cases, conical) bottom 5.

At the junction between the neck 3 and the body 4, the preform 2 has a collar 6 by which the preform 2 is suspended in the various steps of manufacturing the container.

However, in the heating unit 1, the preforms 2 are attached to pivoting supports called spinners, which drive the preforms 2 in rotation around their principal axis A so as to expose the part below the neck (the entire body 4 and the bottom 5) to the heating. Each spinner is attached to a chain driven by a wheel, and comprises a pinion engaging a fixed or mobile meshing means, such as a chain or belt, so that each point situated on the circumference of the preform 1 describes on the path of the preform 2 a cycloid having a period equal to the distance traveled by the preform 2 in one complete revolution around its axis A.

Represented in FIGS. 1 and 2 are the preforms 2 with the neck 3 upwards, but this representation is arbitrary and illustrative, and the preforms 2 could be oriented with the neck downwards.

The heating unit 1 consists of an oven 7 having at least one radiating wall 8 in front of which the preforms 2 travel. Said wall 8 is lined with a plurality of electromagnetic radiation sources 9 emitting both monochromatic (or pseudo-monochromatic) and directive electromagnetic radiation towards the preforms 2, in the infrared range.

As a variant, the heating unit comprises a plurality of cavities lined with sources of radiation, in each of which a preform is received to be individually heated there.

In theory, a monochromatic source is an ideal source, emitting a sinusoidal wave at a single frequency. In other words, its frequency spectrum is composed of a single ray of zero spectral width (Dirac).

In practice, such a source does not exist, a real source being at best quasi-monochromatic, i.e., its frequency spectrum extends over a band of spectral width that is small but not zero, centered on a principal frequency where the intensity of radiation is maximum. In common parlance, however, such a real source is called monochromatic. Moreover, a source emitting quasi-monochromatically over a discrete spectrum comprising several narrow bands centered on distinct principal frequencies is considered to be "pseudo-monochromatic." This is also called multimode source.

In practice, the sources 9 are organized by juxtaposition and superposition to form a matrix 10. For example, this involves laser sources 9, and preferably laser diodes. According to a preferred embodiment, the sources 9 are vertical-cavity surface-emitting laser (VCSEL) diodes, each diode 9 emitting for example a laser beam 11 of rated individual power of several tens of milliwatts at a wavelength situated in the short and medium infrared range—for example on the order of 1 µm.

At the scale of the preforms 2, the diodes 9 can be considered as point sources, each emitting directive radiation, i.e., in the form of a conical light beam 11, the solid half-angle of which is closed at the top, and preferably between 10° and 60° (see FIG. 2, where beams 11 are represented whose half-angle at the top is 10°). The beam 11 can be symmetrical in revolution (i.e., of circular cross-section), or non-symmetrical in revolution (for example elliptical cross-section).

An absorbent (or reflective) plate 12 is disposed horizontally in the space between the radiating wall 8 and the preforms 2, at the level of the collar 6, to preserve the neck 3 from the infrared radiation.

The object of the present application is not to describe in detail the structure of the matrix 10 of laser diodes 9. This is the reason the matrix 10 is represented in a simplified manner, in the form of a plate, the diodes 9 appearing in the form of points.

According to a preferred embodiment, illustrated in FIG. 1, the matrix is subdivided into several adjacent and independent groups 13 of diodes 9, each group 13 being composed of a column of diodes forming a subassembly of the matrix 10. The columns 13 of diodes 9 can be of equal or different width. In this case, the width can decrease (or on the contrary can increase) along the path of the preforms 2.

This architecture makes it possible to produce a modulation of the power (the term intensity can also be used) of the radiation emitted by the diodes 9, either by adjusting the power emitted by the diodes 9 of one or more predefined groups 13, or by turning off (i.e., extinguishing) the diodes 9 of one or more predefined groups 13.

As a variant, or supplementally, the heating unit 1 can be designed to permit a modulation of the speed of travel of the preforms 2, i.e., the exposure time of the preforms 2 to the radiation.

It is therefore possible to modulate the power of the radiation received by the preforms 2 by modulating the power of the radiation emitted and/or by modulating the speed of travel of the preforms 2 in the oven 7.

The modulation of power of each column 13 of diodes 9 is achieved electronically, by means of a control unit 14 in the form of a processor integrated into a computer and programmed for that purpose. The power of the diodes 9, which can be displayed on a control monitor, falls between a predetermined minimum value $P_{min}$ (for example zero) and a corresponding maximum value $P_{max}$, for example at the rated power of the diodes 9. The control unit 14 also controls the selection of the groups 13 of diodes 9 to be lighted or extinguished (i.e., to adjust the value $P_{min}$), as well as the speed of travel of the preforms 2, if applicable. To that end, the control unit 14 is for example connected to the toothed wheel on which the chain or belt driving the preforms 2 circulates.

As illustrated in FIG. 1, the heating unit 1 is equipped with a thermal probe 15 connected to the control unit 14 and making it possible to measure the temperature $T_{ext}$ of an outer wall 16 of the preform 2 at the exit of the oven 7, whether the probe 15 is situated inside the oven or, as illustrated in FIG. 1, outside thereof (so that the temperature measured by the probe 15 corresponds relatively accurately to the actual temperature of the outer wall 16 at the moment the preform 2 leaves the oven 7).

The measurement of the temperature $T_{ext}$ can be localized (for example at mid-height of the preform 2), in which case the probe 15 is a simple thermal sensor. Preferably, however, the purpose of the temperature measurement is to produce a thermal profile of the outer wall 16 on at least one part (and possibly all) of the body 4, beneath the collar 6. In this case, the probe 15 can comprise a series of sensors distributed vertically facing the body 4, or as illustrated in FIG. 1, it can be in the form of a thermal imaging camera (infrared) arranged to perform a complete thermography of the outer wall 16.

The measurements (or the thermographic data in the case of a thermal imaging camera) are communicated to the control unit 14, which, based on the temperature thus measured, or the temperature profile thus established, is programmed to control a modulation:

of the time of exposure of the preforms 2 to the infrared radiation from the sources 9 via the partial extinction of certain groups 13 of diodes 9 and/or the adaptation of the speed of travel of the preforms 2, and/or the electrical power furnished to the sources (and therefore the power emitted by the sources 9), in all or in part, and preferably by columns 13, in order to maintain the temperature $T_{ext}$ of the outer wall 16 of the preform 2 within a predetermined range, the lower end of which is the glass transition temperature $T_g$, noted as $T_g$, of the material, and the upper end of which is equal to $1.8 \cdot T_g$:

$$T_g \leq T_{ext} \leq 1.8 \cdot T_g$$

The control unit 14 makes the adjustments with respect to the lighting or extinction of the sources 9, the speed of travel of the preforms 2 and/or the power of the sources 9 while the temperature does not fall within the range $[T_g; 1.8 \cdot T_g]$.

According to a preferred embodiment, a setpoint temperature $T_c$ within the range $[T_g; 1.8 \cdot T_g]$ is programmed into the control unit 14, which makes the adjustments as long as the temperature $T_{ext}$ is not equal to (or substantially equal to, at a close predetermined tolerance, for example on the order of several degrees) to the setpoint $T_c$.

In the case of a localized temperature measurement, the temperature $T_{ext}$ in question is the temperature measured by the probe 15 reduced to a simple thermal sensor.

In the case of a thermographic measurement made by a thermal imaging camera 15, the temperature $T_{ext}$ designates the temperature measured at any point of the outer wall 16, i.e., the aforementioned inequality must be verified for all of the temperatures measured on the outer wall 16. In order to save processing time, the control unit 14 can be programmed to extract from the measured thermal profile the minimum value $T_{min}$ and the maximum value $T_{max}$ of all of the values, or simply verify the following dual condition:

$$T_{min} \geq T_g$$

$$T_{max} \leq 1.8 \cdot T_g$$

It is known that beyond its glass transition temperature $T_g$, a thermoplastic polymer is by definition deformable without breaking.

In the present case, it is not sufficient that the temperature $T_{ext}$ of the outer wall 16 be actually greater than the glass transition temperature $T_g$; the temperature of an inner wall 17 of the preform 2, opposite the outer wall 16, must also be greater. Unexpectedly, it has been found that the temperature—noted $T_{int}$—of the inner wall 17 is greater than the temperature $T_{ext}$ of the outer wall 16 under the following operating conditions:

the radiation to which the preforms 2 are exposed is infrared and monochromatic (or, as we have explained, pseudo-monochromatic);

the material of the preforms 2 is a polymer that is semi-transparent in the infrared range, i.e., it only partially transmits the radiation in this range;

the temperature of the outer wall is maintained within the bounds indicated above ($T_g$ and $1.8 \cdot T_g$).

For a more precise definition of semi-transparent media, reference can be made to the thesis "Modélisation et optimisation numérique de l'étape de chauffage infrarouge pour la fabrication de bouteilles en PET par injection-soufflage" [Digital modeling and optimization of the infrared heating step in the manufacture of bottles made of PET by injection-blow molding], M. Bordival, Ecole des Mines de Paris, 2009. PET is typically a semi-transparent polymer.

Figure 3:
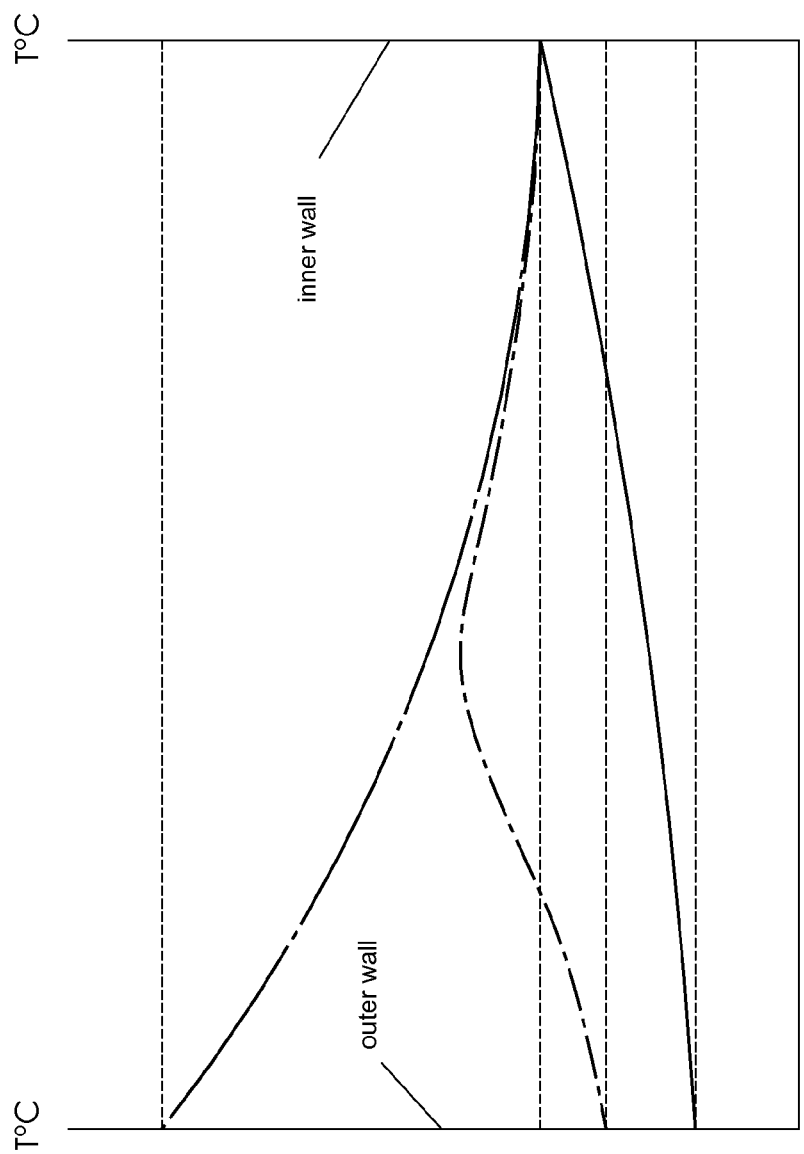
FIG. 3 is a diagram illustrating various temperature profiles in the thickness of the wall of the preform.

It has also been found that under these conditions, the temperature variation in the thickness of the preform 2 between the outer wall 15 and the inner wall 16 (solid line in FIG. 3) is strictly increasing.

The result is a heat distribution in the thickness of the preform 2 that is different from that of the known methods in which:

either the temperature delta ($\Delta T = T_{int} - T_{ext}$) is negative, the temperature decreasing between the outer wall and the inner wall (long broken lines in FIG. 3), which corresponds to conventional uncontrolled heating, or the temperature delta is positive, the temperature increasing on average between the outer wall and the inner wall, but reaches a peak in the thickness (short broken lines in FIG. 3), which corresponds to conventional heating with attempted control by cooling the outer wall by forced ventilation.

In the present case, the temperature within the thickness of the preform is strictly increasing, which makes it possible to perform blowing during which the stresses induced during the formation of the container are minimized, the positive temperature delta ($\Delta T = T_{int} - T_{ext}$) and the absence of temperature peak between the outer wall 15 and the inner wall 16 compensating for the difference in stretching rate between the walls 15, 16. The result is an increased capacity for impression of the material (and thus forming of the container).

Furthermore, the amount of energy needed to be supplied in order to obtain the desired temperature profile, with a positive temperature delta, is less than what is necessary to supply in the application of known technologies, where the outer wall is heated at a high temperature to ensure sufficient energy transfer to the inner wall, then the outer wall is ventilated to lower the temperature and obtain the temperature delta. The result is savings in energy consumption.

The parameters of power and/or exposure time are controlled by the control unit 14.

More specifically, in a hypothesis in which the temperature of the outer wall 15 is lower than the glass transition temperature, the control unit 14 controls:

an increase of the power emitted by the sources 9, for example by increasing it in predetermined portions, either locally on one or more columns 12, or on the entire matrix 10;

and/or an increase of the number of groups 13 of lighted diodes 9;

and/or a decrease of the speed of travel of the preforms 2 in the oven 7.

In the reverse hypothesis in which the temperature $T_{ext}$ of the outer wall 15 is greater than $1.8 \cdot T_g$, then the control unit 14 controls:

a decrease of the power emitted by the sources 9, for example by decreasing it in predetermined proportions, either locally on one or more columns 12, or on the entire matrix 10;

and/or a decrease of the number of groups 13 of lighted diodes 9;

and/or an increase in the speed of travel of the preforms 2 in the oven 7.

Only one of these two operations can be controlled by the control unit 13 [sic: 14].

If the priority is to maintain the rate of production, then the preferred option is to modulate the power without modulating the pace. If the priority is to maintain the power (for example in order to achieve energy savings), then the preferred option is to modulate the speed of travel.

However, it is conceivable for the control unit 14 to simultaneously control both operations in order to obtain a good compromise between power consumption (which should be as low as possible) and the rate of production (which should be as high as possible).

The invention claimed is:

1. A method of heating a blank of plastic material for the manufacture of a hollow body by forming from the blank, which comprises:

inserting the blank into an oven provided with sources of monochromatic or pseudo-monochromatic electromagnetic radiation emitting in the infrared range;

exposing the blank to the radiation from the sources, adjusted to a predetermined emission power for a predetermined exposure time;

measuring a temperature ($T_{ext}$) on an outer wall of the blank;

adjusting the exposure time and/or the emission power so that said temperature $T_{ext}$, measured at an exit from the oven, does not fall between $T_g$ and $1.8 \cdot T_g$, where $T_g$ is the glass transition temperature of the material; and wherein the temperature of an inner wall of the blank remains higher than the temperature of the outer wall so that a temperature difference is positive.

2. The method according to claim 1, wherein the temperature measurement is a localized measurement.

3. The method according to claim 1, wherein the temperature measurement comprises establishing a thermal profile of the outer wall of the blank by means of a thermal imaging camera.

4. The method according to claim 1, wherein the variation of the exposure time is accomplished by turning off certain sources, or by turning off groups of sources.

5. The method according to claim 1, wherein the variation of the exposure time is accomplished by varying the speed of travel of the blank in the oven.

6. A non-transitory computer program product for a processing unit and/or stored on a storage medium readable by a reader of the processing unit, comprising instructions for the implementation of the operations of a method according to claim 1.

7. A heating unit for heating hollow body blanks made of plastic material, which comprises:

an oven provided with a plurality of sources of monochromatic or pseudo-monochromatic electromagnetic radiation emitting in the infrared range, for the heating of the blanks at a predetermined emission power, and for a predetermined exposure time, a thermal probe placed at an exit of the oven, arranged for taking the temperature ($T_{ext}$) on an outer wall of the blanks; and a control unit programmed to adjust the emission power and/or the exposure time as long as said temperature $T_{ext}$ does not fall between $T_g$ and $1.8 \cdot T_g$, where $T_g$ is the glass transition temperature of the material and the temperature of an inner wall of the blank remains higher than the temperature of the outer wall so that the temperature difference is positive.

8. The heating unit according to claim 7, wherein the sources of electromagnetic radiation are lasers.

9. The heating unit according to claim 8, wherein the sources of electromagnetic radiation are laser diodes.

10. The heating unit according to claim 8, wherein the sources of electromagnetic radiation are VCSEL laser diodes.

11. The heating unit according to claim 7, wherein the sources are organized in columns the power of which can be modulated separately.

* * * * *